Figure 1:
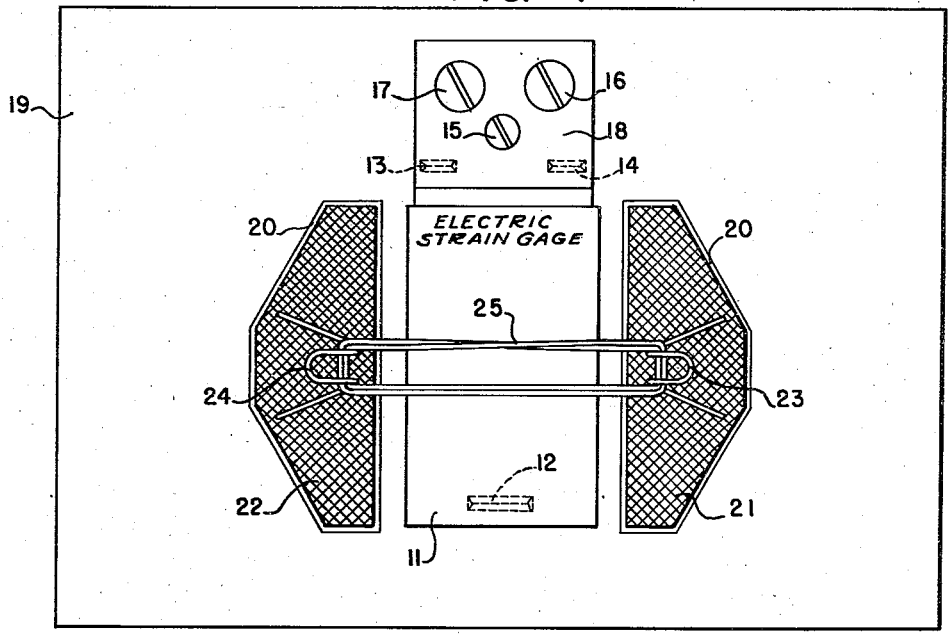

Aug. 7, 1945.   C. M. HATHAWAY   2,381,283
MEANS FOR MOUNTING TESTING APPARATUS
Filed Nov. 8, 1943

INVENTOR.
CLAUDE M. HATHAWAY
BY Alois W. Graf
ATTORNEY

Patented Aug. 7, 1945

2,381,283

UNITED STATES PATENT OFFICE 2,381,283

MEANS FOR MOUNTING TESTING APPARATUS

Claude M. Hathaway, Denver, Colo., assignor to Hathaway Instrument Company, a corporation of Colorado Application November 8, 1943, Serial No. 509,436

7 Claims. (Cl. 73—88)

My invention relates to testing apparatus and, more particularly, to apparatus for securing in position a strain gage unit on a body to be subjected to stress or strain.

Heretofore strain gage units of the electromagnetic type having a movable armature arranged to vary the effect of a pair of electromagnetic coils have usually been secured to the member to be subjected to stress or strain by securing means, such as cap screws or stud bolts. Such methods of securing the strain gage are satisfactory where the body to be tested is to be subjected to repeated strains or stresses over a considerable period of time, as, for example, in the testing of beams in bridges or rails in railroad tracks. For other purposes in the testing of materials, however, the drilling and tapping of the holes in the piece to be tested are time consuming and frequently undesirable since it might be preferable not to mar or otherwise change the configuration and appearance of the body to be tested.

Strain gage units which are attached by screws measure the strain some distance above the outer surface of the member which is being subjected to strain. Where the member is being subjected to pure tension stress, such measurement is an accurate measurement of the strain, but where the member is subjected to stress including bending, an accurate measurement is not obtained. If the strain could be measured at the surface of the member being stressed, an accurate measurement could be obtained for both tension and bending stresses. A strain gage unit of the electromagnetic type suitable for measuring the strain at the surface of a member subjected to stress has been devised which has a movable armature arranged to be moved in response to surface changes occurring as a result of tension or compression. Such strain gage unit is provided with a plurality of surface engaging or gripping members which may be in the form of knife edge supports. Some of the knife edge supports are rigidly connected to the body or frame of the gage and at least one knife edge support is pivotally mounted and connected to actuate the movable armature of the gage unit. In order to obtain an accurate measurement of tension or compression at the surface of the member it is necessary to secure the gage unit so that there is no movement of the knife edge supports relative to the surface of the member. In utilizing such strain gage unit it again would be desirable to avoid attaching gage fastening means to the member by screws. The desirable combination to satisfy all requirements would comprise a strain gage unit of the latter type together with fastening means which are readily secured to the member being stressed and which permit ready removal of the gage unit for calibration purposes.

In accordance with the present invention these desirable requirements are met by providing a strain gage of the type having a plurality of surface engaging or gripping members together with apparatus readily secured to a member to be tested whereby the strain gage is readily fastened in position and readily removed for calibration. A pair of mesh plates are provided which are secured to the surface of the body to be tested, and fastening means are passed over the strain gage and secured to suitable hooks or other fastening means forming a part of the mesh plate members. These mesh plate members preferably are secured to the body to be tested by an adhesive bonding medium which is extensible and compressible and yet will resist the vertical components exerted thereon tending to lift the plates away from the surface of the test body.

It therefore is an object of my invention to provide an improved apparatus for securing a strain gage unit to the surface of a body to be tested by subjecting the body to stress or strain.

It is a further object of my invention to provide readily attachable and detachable fastening means to the surface of a body to be subjected to stress or strain for securing thereto a strain gage unit without materially altering the distribution of stress or strain in the direction to which the strain gage is responsive to stress or strain.

Figure 2:
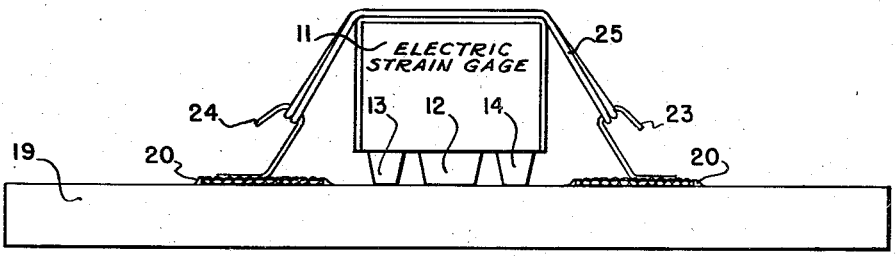
Figure 3:
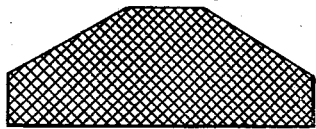
Figure 4:
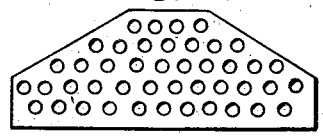

Other and further objects will subsequently become apparent and the invention itself is set forth with particularity in the appended claims. The invention will be readily understood by reference to the following description taken in connection with the accompanying drawing, wherein Figure 1 is a top view of a body to be tested which has been provided with a strain gage unit and suitable means for securing the unit in position; Fig. 2 is an end view of the apparatus shown in Fig. 1; Fig. 3 is a view of a portion of the securing means used in Figs. 1 and 2; and Fig. 4 shows a securing means made of a different type of mesh plate.

Referring to Figs. 1 and 2 of the drawing, there is shown an electromagnetic strain gage 11 which is provided adjacent one end with a knife edge support 12 which is arranged to actuate an armature supported in the magnetic field of a pair of electromagnetic coils. The strain gage unit 11 is furthermore provided adjacent the other end with a pair of knife edge supports 13 and 14, the position of which may be adjusted by a cam which can be actuated by a screw member 15 whenever a pair of lock screws 16 and 17 are first released. The adjustment provided by the cam actuator 15 and the lock screws 16 and 17 operating on an adjustment plate 18, corresponds to an arrangement well known in the art for the purpose of balancing the position of the armature controlled by the knife edge 12 prior to the measurement or indication of stress or strain which is to be applied to a test body, such as 19, to which the strain gage 11 is to be secured. The strain gage 11 may be of the type shown in my co-pending application filed July 21, 1943, Serial Number 495,617, entitled "Gages."

In the arrangement shown in Figs. 1 and 2, it is assumed that it is desired to measure stress or strain in a direction parallel to the longitudinal axis of the strain gage 11. Two portions of the surface of the test body 19 adjacent to the sides of the strain gage unit 11 are coated with a suitable adhesive bonding medium or substance 20, which may be of a plastic type, for example an alkyd resin such as "Glyptol" cement, so that the cement which is extensible and compressible will follow the stress or strain of the body without releasing its bond with the surface of the body. Two mesh plates are embedded in the bonding substance and, in accordance with the preferred embodiment of the present invention, each of these mesh plates consists of a woven mesh member having the strands arranged at acute angles to the direction of stress or strain to be introduced into the test body 19. By thus placing the strands of the woven material at angles to the direction of stress or strain the securing members will not materially affect the distribution of stress or strain since there is a certain amount of compression and extension permitted along the bias of the weave of the mesh plates. It has been found that a strong fabric, such as a woven wire member, may be used as shown in Figs. 1 and 2. Thus a woven wire member 21 is placed to one side of the strain gage 11 and a similar woven wire member 22 is placed along the other side of the strain gage. These members are each provided with suitable fastening hooks 23 and 24, respectively, which are secured to the woven wire mesh in any desired manner, such as soldering or spot welding. The wire mesh permits the attachment plates 21 and 22 to be readily embedded in the bonding medium and, furthermore, permits rapid drying of this bonding medium. The ends of the wire hooks or fastening members 23 and 24 are engaged by a resilient fastening member 25 which may be in the form of a rubber band. While a less elastic fastening means might be used to secure in position the strain gage 11, it has been found that the resilient fastening means, such as the rubber band 25, is easier to apply and insures a certain desired degree of tension between the top surface of the strain gage 11 and each of the hooks 23 and 24. It furthermore has been found that this tension exerted by a resilient fastening means is of particular advantage where the test member 19 might also be subjected to vibration as well as stress and strain. It has been found, too, that the test block 19 might also be subjected to tremendous acceleration forces amounting to five or six times the acceleration obtained by the force of gravity, and yet the strain gage 11 will be retained in the initial position in which it was secured to the test block 19.

While it has been stated that a wire screen or woven wire member, such as 21 or 22, is preferable because of the rapidity with which it may be secured in the bonding medium, and the fact that it does not materially affect the distribution of stress or strain in the body to be tested, other materials have also been found to be highly desirable. For example, such materials may include a resin or plastic impregnated fabric, or woven mesh material, or a mesh plate made of thin metal, fibre or plastic material. The general configuration found suitable has also been shown in Fig. 3 which shows the arrangement of the mesh plate so that its maximum strength is at an acute angle to the direction in which stress or strain is to be measured in the test body. The arrangement shown in Fig. 4 illustrates that a thin metal fibre or plastic plate may be perforated so as to form a mesh plate which also may be readily embedded in a plastic bonding substance so as to obtain a relatively short time for attaching the plates to the body to be tested. The attachment plates, such as shown in Figs. 3 and 4, therefore, do not require great longitudinal strength but need only such strength as to resist effectively the component of forces exerted thereon which is generally perpendicular to the surface of the test body, since this is the force which tends to hold in position the magnetic strain gage and which is resisted by the adhesion of the attachment plate to the surface of the body to be tested by virtue of its construction and the adhesive powers of the bonding substance.

It therefore will be appreciated that in accordance with the present invention there has been provided an apparatus for securing to a test body to be subjected to stress or strain a strain gage or other stress or strain measuring device which at all times is held and retained in intimate contact with the surface of the body which is being subjected to stress or strain.

While particular embodiments of the present invention have been shown and described, it of course is to be understood that I am not to be limited thereby since modifications may be made which wall within the spirit and scope of the appended claims.

I claim:

1. The apparatus for attaching a strain gage of the type having a plurality of supports adapted to engage the surface of a body to be subjected to stress or strain, comprising a pair of spaced apart relatively rigid mesh members embedded in a bonding substance and adhering to the surface of said body, and a resilient member interconnecting said mesh members and adapted to secure the supports of a strain gage placed thereunder in intimate contact with the surface of the body to be subjected to stress or strain.

2. The apparatus for attaching a strain gage of the type having a plurality of body engaging supports adapted to engage the surface of a body to be tested, comprising a pair of fastening members each including a flat sheet of strong relatively rigid mesh material adapted to be secured to the surface of said body by an adhesive bonding substance, and a resilient fastening member secured to each fastening member for passing over said gage to hold said gage in position.

3. The apparatus for attaching a strain gage having a plurality of knife-edge supports adapted to engage the surface of a body to be subjected to stress or strain, comprising a pair of relatively rigid mesh material members each adapted to be arranged at opposite sides of said gage, plastic adhesive means securing said members to said body, and a resilient fastening means secured to each mesh member and passing over said gage to hold the knife edges thereof in engagement with the surface of said body.

4. The combination for attaching an electrical strain sensitive apparatus having a plurality of supporting members adapted to engage the surface of the test body, comprising a pair of mesh plates each having a greater strength at an angle to the length and breadth thereof and adapted to be arranged on the surface of said test body at opposite sides of said apparatus, an extensible and compressible bonding medium secured to the surface of said test body and to said mesh plates, and a resilient securing member interconnecting said plates and being adapted to engage said apparatus to apply thereto a force through the supporting members thereof perpendicular to the surface of said test body to prevent movement of said apparatus relative to said test body.

5. The apparatus for attaching a strain gage having a plurality of members adapted to engage the surface of a test body, comprising an extensible and compressible bonding medium adapted to be secured to said test body, a pair of perforated relatively rigid plate fastening members each adapted to be arranged at a different side of said gage and being at least partially embedded in said bonding medium and bonded thereto by adherence, and a member interconnecting said fastening members and being adapted to engage the top of said gage to apply thereto a force perpendicular to the surface of said test body.

6. An elongated attachment plate adapted to be secured to a test body by a flexible and contractible layer of bonding medium, said plate being formed of strong flexible perforated material so as to be more extensible and contractible in a direction parallel to the direction of the strain in a test body than at an angle to the direction of the strain, and a fastening member secured to said plate.

7. An attachment plate adapted to be secured to a test body by an extensible and compressible bonding medium, said plate being formed of wire cloth having the wires arranged at acute angles to the direction of the strain to be measured in said test body whereby the distribution of strain in said test body will be substantially unaffected by said attachment plate, and a fastening member secured to said wire cloth member.

CLAUDE M. HATHAWAY.